(12) United States Patent
Sato et al.

(10) Patent No.: US 9,200,699 B2
(45) Date of Patent: Dec. 1, 2015

(54) DIFFERENTIAL GEAR PROVIDED WITH DIFFERENTIAL LOCK MECHANISM

(71) Applicant: HONDA MOTOR CO., LTD., Tokyo (JP)

(72) Inventors: Koji Sato, Wako (JP); Koshi Hayakawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/505,192

(22) Filed: Oct. 2, 2014

(65) Prior Publication Data
US 2015/0096822 A1    Apr. 9, 2015

(30) Foreign Application Priority Data

Oct. 7, 2013   (JP) ................................. 2013-210205
Aug. 18, 2014  (JP) ................................. 2014-166167

(51) Int. Cl.
| | |
|---|---|
| *B60K 17/354* | (2006.01) |
| *F16H 48/30* | (2012.01) |
| *B60K 23/04* | (2006.01) |
| *F16H 59/10* | (2006.01) |
| *F16H 61/36* | (2006.01) |
| *B60K 23/08* | (2006.01) |

(52) U.S. Cl.
CPC ................ *F16H 48/30* (2013.01); *B60K 23/04* (2013.01); *B60K 17/352* (2013.01); *B60K 17/354* (2013.01); *B60K 2023/046* (2013.01); *B60K 2023/0891* (2013.01); *F01N 2340/04* (2013.01); *F16H 59/10* (2013.01); *F16H 61/36* (2013.01); *F16H 2048/305* (2013.01)

(58) Field of Classification Search
CPC .... B60K 17/346; B60K 17/348; B60K 17/35; B60K 17/352; B60K 17/354; B60K 2023/0841; B60K 2023/0883; B60K 2023/0891
See application file for complete search history.

(56) References Cited

U.S. PATENT DOCUMENTS

| | | | | |
|---|---|---|---|---|
| 5,605,213 | A  * | 2/1997  | White | 192/82 R |
| 7,784,582 | B2 * | 8/2010  | Takahashi et al. | 180/336 |
| 8,725,376 | B2 * | 5/2014  | Murota et al. | 701/69 |
| 2007/0068328 | A1 * | 3/2007  | Suzuki | 74/523 |
| 2011/0111913 | A1 * | 5/2011  | Haggerty | 475/231 |
| 2011/0130239 | A1  | 6/2011  | Sato et al. | |
| 2012/0266710 | A1 * | 10/2012 | Seegert et al. | 74/473.3 |

FOREIGN PATENT DOCUMENTS

JP      2011-117511 A      6/2011

* cited by examiner

*Primary Examiner* — Joseph Rocca
*Assistant Examiner* — Marc A Scharich
(74) *Attorney, Agent, or Firm* — Westerman, Hattori, Daniels & Adrian, LLP

(57) ABSTRACT

A differential mechanism regulating device which is mechanically connected to two manipulators is miniaturized. When a first cable and a second cable are pulled, a collecting member moves its position. As a result of this movement, the collecting member tilts a portion of an arm by way of a rod. As a result, a differential lock is released. The operation of the first cable and the operation of the second cable can be merged by the collecting member, and it is sufficient to connect only a collecting transmission member to the arm. The connection between the arm and the collecting transmission member can be simplified thus realizing the miniaturization of the differential mechanism.

11 Claims, 15 Drawing Sheets

DIFFERENTIAL GEAR PROVIDED WITH DIFFERENTIAL LOCK MECHANISM

CROSS REFERENCE TO RELATED APPLICATIONS

The present application claims priority under 35 U.S.C. §119 to Japanese Patent Application No. 2013-210205, filed Oct. 7, 2013, and Japanese Patent Application No. 2014-166167, filed Aug. 18, 2014, the contents of which are incorporated herein by reference, in their entirety.

TECHNICAL FIELD

The present invention relates to an improvement in a differential gear provided with a differential lock mechanism.

BACKGROUND OF THE INVENTION

A differential gear is a device for generating a difference in rotational speed between left and right wheels. There may be a case where it is necessary not to provide a difference in rotational speed between left and right wheels depending on a traveling state. In this case, a mechanism which regulates the differential gear (hereinafter referred to as a differential lock mechanism) is attached to the differential gear. Various proposals have been made with respect to such a differential gear provided with a differential lock mechanism (see JP-A-2011-117511 (FIG. 3), for example).

As shown in FIG. 3 of JP-A-2011-117511, a fork member is tilted by a lever member indicated by an imaginary line, and a lock pin is inserted into pin holes with the fork member. As a result, an output-side cam is integrally joined to a ring gear thus establishing a differential locked state. That is, by operating the lever member by a manipulator, it is possible to perform switching of a drive mode as represented by switching between lock (differential lock) and unlock (release of differential lock) in a differential gear.

Aside from a differential lock during traveling, there has been a demand for a differential gear which is brought into a locked state even during parking. In this case, it is necessary to provide a manipulator for changing over a drive mode and a manipulator for parking.

Accordingly, it is necessary to provide the structure where a cable is extended from the drive mode manipulator and the cable is mechanically connected to a differential lock mechanism. A cable is also extended from the manipulator for parking and the cable is mechanically connected to the differential lock mechanism. Since the structure has two connection portions, there is a tendency for the structure of a differential gear provided with a differential lock mechanism to become complicated and large.

However, amidst a demand for the miniaturization of a vehicle, there has been also a demand for miniaturization of a differential gear provided with a differential lock mechanism.

SUMMARY OF THE INVENTION

A differential gear provided with a differential lock mechanism which is mechanically connected to two manipulators is miniaturized according to the following description.

A first aspect is directed to a differential gear provided with a differential lock mechanism which includes:

a differential mechanism which transmits a drive force inputted from a power unit to left and right drive shafts, and generates the difference in rotational speed between left and right wheels connected to the left and right drive shafts;

a differential lock mechanism which is attached to the differential mechanism and brings the differential mechanism into a non-differential state; and a switching means which is attached to the differential lock mechanism, and changes over a state of the differential lock mechanism between an operation state and a release state, wherein a first manipulator to which one end of a first cable is connected, and which is capable of operating the switching means through the first cable, a second manipulator which is in addition to the first manipulator, to which one end of a second cable is connected, and which is capable of operating the switching means through the second cable, a collecting member which is provided between the first and second cables and the switching means, to which the other end of the first cable and the other end of the second cable are connected, and which transmits an operational force from the first manipulator and the second manipulator, and a collecting transmission member which connects the collecting member and the switching means to each other and transmits an operational force of the collecting member to the switching means are provided.

A second aspect is characterized in that the switching means includes a spring which always biases the differential mechanism to a non-differential state side.

A third aspect is characterized in that an elongated hole is formed in the collecting member or the switching means, the elongated hole preventing the switching means from being operated while allowing the collecting member to move when only one of the first and second manipulators is operated.

A fourth aspect is characterized in that the first and second cables are connected to the collecting member by way of adjusters which adjust cable lengths of the first and second cables.

A fifth aspect is characterized in that the differential gear includes a cable stay which supports one ends of the first and second cables, and the differential gear includes a casing which houses the cable stay and the collecting member, and the casing is mounted on an upper surface of a gear casing which houses the differential mechanism.

A sixth aspect is characterized in that the first manipulator is a switching lever which changes over a drive mode, and the second manipulator is a switching lever being operated during parking of a vehicle.

A seventh aspect is characterized in that the differential mechanism includes a cylindrical shaft through which one of the left and right drive shafts penetrates and is collectively housed in the gear casing, a bearing which supports the cylindrical shaft and a rotary shaft which is rotated by the switching means are mounted on the gear casing, and the bearing is arranged in the vicinity of the rotary shaft and overlaps with the rotary shaft in a vehicle width direction.

An eighth aspect is characterized in that the differential gear includes a cable stay which supports one ends of the first and second cables, and the differential gear includes a casing which houses the cable stay and the collecting member, and the casing is connected to the differential mechanism by way of a third cable arranged between the casing and the differential mechanism.

A ninth aspect is characterized in that an inspection lid is mounted on a foot rest floor on which a passenger places his feet in an openable/closeable manner, and the casing is arranged in a region below the inspection lid.

A tenth aspect is characterized in that the switching means to which the third cable is connected and an exhaust pipe are arranged above the differential mechanism and between left and right vehicle body frames, the switching means is arranged on a left side or a right side of the exhaust pipe in the vehicle width direction, and a heat shield panel which shields heat emitted to the switching means from the exhaust pipe is arranged between the exhaust pipe and the switching means.

In the first aspect, the collecting member and the collecting transmission member are interposed between the first and second cables and the switching means. The operation of the first cable and the operation of the second cable can be merged by the collecting member, and it is sufficient to connect only the collecting transmission member to the switching means. The connection between the switching means and the collecting transmission member becomes extremely simple thus miniaturizing the connection between the switching means and the collecting transmission member. As a result, it is possible to miniaturize the differential gear provided with a differential lock mechanism which is mechanically connected to two manipulators.

In the second aspect, when a collected force generated by the collecting member is not transmitted to the switching means, the differential mechanism is held in a non-differential state (differential locked state). That is, the differential locked state is maintained even when the first or the second cable is slackened by stretching or the like.

In the third aspect, the elongated hole which prevents the switching means from being operated, while allowing the collecting member to move when only one of the first and second manipulators is operated, is formed in the collecting member or the switching means. That is, the differential gear is configured such that the differential lock is not released when only one of the first and second manipulators is operated.

In the fourth aspect, the posture adjustment and the position adjustment of the collecting member and the adjustment of cable lengths can be collectively performed and hence, maintainability of the differential gear can be enhanced.

In the fifth aspect, the cable stay and the collecting member are housed in the casing. Since no foreign substance such as soil or sand is deposited on the cable stay and the collecting member, the smooth movement of the cable and the smooth operation of the collecting member are maintained. Further, the casing is arranged on the upper surface of the gear casing and hence, scattered pebbles or the like minimally impinge on the casing.

In the sixth aspect, the first manipulator is a switching lever which changes over a drive mode, and the second manipulator is a switching lever operated during parking of a vehicle. Accordingly, provided that the differential lock is brought into a differential locked state by the switching lever operated during parking, the differential lock is not released even when the switching lever for changing over the drive mode is operated.

In the seventh aspect, in mounting the bearing which supports the cylindrical shaft and the rotary shaft which is rotated by the switching means on the gear casing, the rotary shaft is arranged in the vicinity of the bearing. Since the bearing and the rotary shaft are arranged close to each other, increase in size of the gear casing can be suppressed whereby the differential gear provided with a differential lock mechanism can be formed into a compact shape.

In the eighth aspect, by arranging the third cable between the casing and the differential mechanism, the casing can be arranged at a position away from the differential mechanism. The casing can be arranged at a relatively free position and hence, it is possible to enhance maintenability such as the adjustment of a play of the cable.

In the ninth aspect, the inspection lid is mounted on the foot rest floor on which a passenger places his feet in an openable/closeable manner, and the casing is arranged in a region below the inspection lid. That is, by making use of a space where a passenger places his feet which can ensure a wide space, the maintenance such as the adjustment of a play of the cable can be performed through an opening formed in such a space.

In the tenth aspect, the heat shield panel is arranged between the exhaust pipe and the switching means. Heat emitted to the switching means from the exhaust pipe can be shielded and hence, the switching means, which should be protected from dirt, can be covered by a dustproof cover made of a resin. That is, the third cable can be wired on an upper surface of the differential mechanism while preventing a thermal influence of the exhaust pipe. Due to the provision of the heat shield plate, the exhaust pipe and the switching means can be arranged close to each other and hence, accessories can be arranged on the vehicle in a compact manner.

BRIEF DESCRIPTION OF THE DRAWINGS

The advantages of the invention will become apparent in the following description taken in conjunction with the drawings, wherein.

DETAILED DESCRIPTION OF THE INVENTION

An embodiment of the invention is explained hereinafter by reference to attached drawings.

First and second manipulators are explained by reference to FIG. 1 to FIG. 6, and a differential gear provided with a differential lock mechanism according to the invention is explained in detail by reference to FIG. 7 and drawings which follow FIG. 7.

Figure 1:
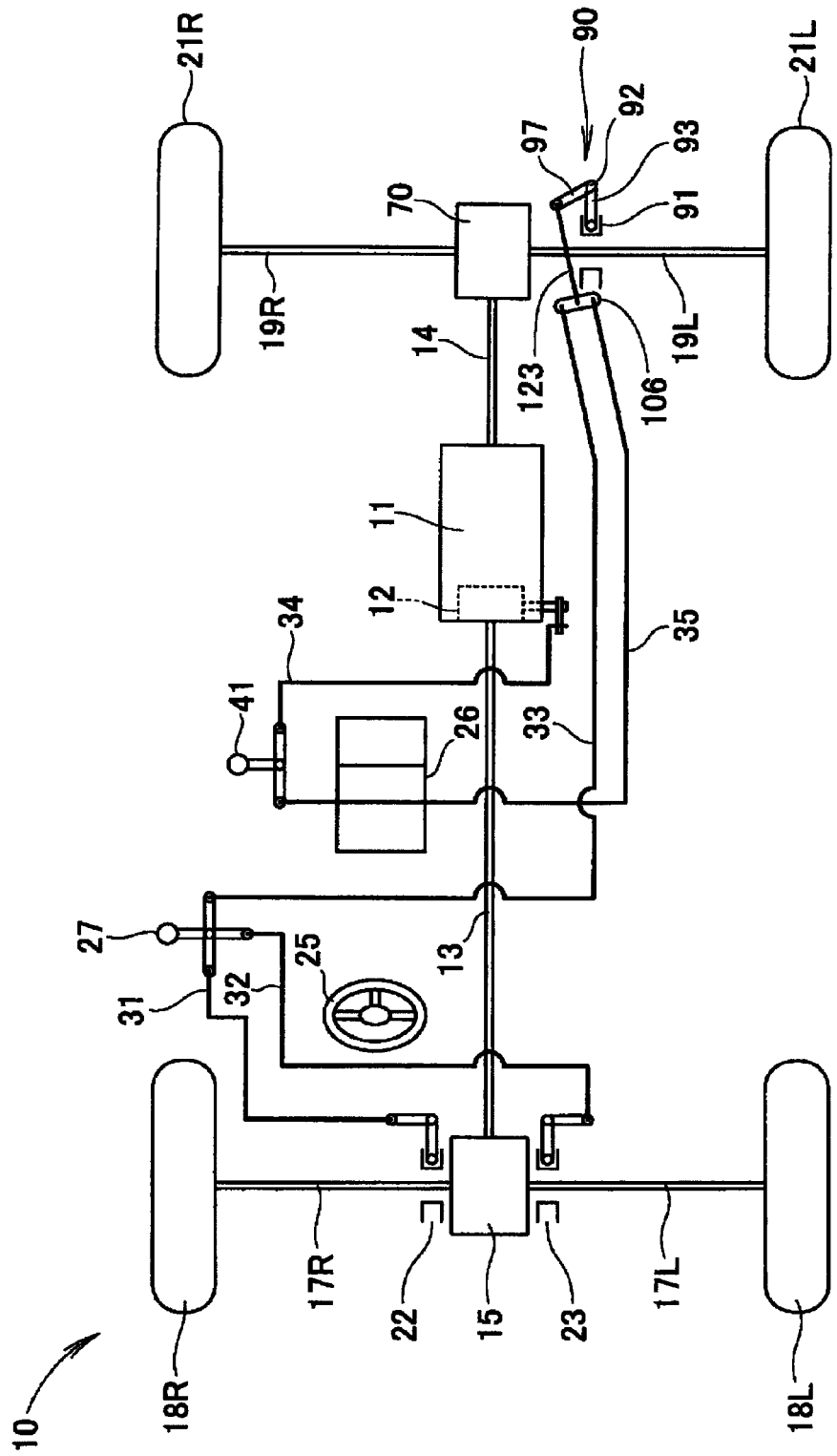
FIG. 1 is a plan view (schematic view) showing a drive system of a vehicle.

As shown in FIG. 1, a vehicle 10 includes: a power unit 11; a transmission 12 which transmits power of the power unit 11 with a speed change and is represented by a gear transmission; a front propeller shaft 13 and a rear propeller shaft 14 which extend frontward and rearward from the transmission 12 for transmission of power; a front differential gear 15 which distributes power transmitted through the front propeller shaft 13 to left and right sides; a differential gear 70 provided with a rear differential lock mechanism which distributes power transmitted through the rear propeller shaft 14 to left and right sides; front drive wheels 18L, 18R which constitute left and right wheels and are driven by the front differential gear 15 through drive shafts 17L, 17R ("L" being a suffix indicating a left side with reference to a driver, "R" being a suffix indicating a right side with reference to the driver, the same definition being also applied to the explanation made hereinafter); and rear drive wheels 21L, 21R which constitute left and right wheels and are driven by the differential gear 70 provided with a rear differential lock mechanism through drive shafts 19L, 19R.

The vehicle 10 may preferably be an all-terrain vehicle which can travel not only on a flat road surface but also on irregular ground such as wilderness. Accordingly, the front differential gear 15 includes: a front differential lock mechanism 22; and a two-wheel drive/four-wheel drive switching mechanism 23.

The differential gear 70 provided with a rear differential lock mechanism includes a differential lock mechanism 90 which brings a differential mechanism (FIG. 7, symbol 74) into a non-differential state.

The vehicle 10 further includes a steering handle 25, and a driver's seat 26 on which a driver is seated, and a first manipulator 27 and a second manipulator 41 are arranged on a right side of the driver's seat 26 in the vehicle width direction.

In case of a so-called left-hand drive vehicle, the first manipulator 27 and the second manipulator 41 are arranged on a left side of the driver.

In this embodiment, the first manipulator 27 is a switching lever which changes over a drive mode. The first manipulator 27 is connected to the front differential lock mechanism 22 through a first wire 31, is connected to the two-wheel drive/four-wheel drive switching mechanism 23 through a second wire 32, and is connected to a slide member 91 through a first cable 33.

In this embodiment, the second manipulator 41 is a switching lever which changes over a traveling mode (including a parking mode), that is, a shift lever. The second manipulator 41 is connected to the transmission 12 through a third wire 34, and is connected to the slide member 91 through a second cable 35. Hereinafter, the second manipulator 41 is referred to as a shift lever 41.

Figure 2:
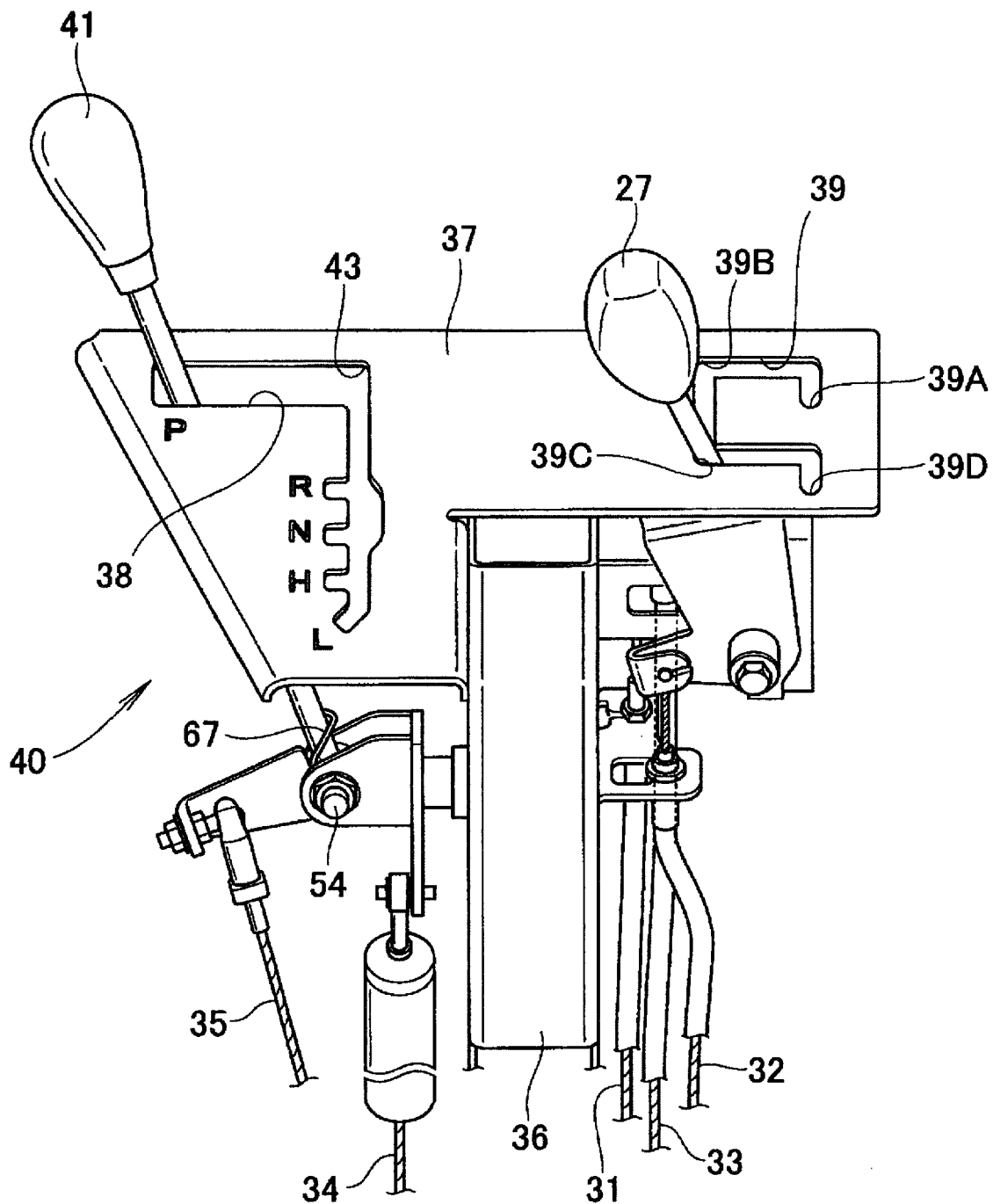
FIG. 2 is a perspective view of first and second manipulators and a shift lever panel.

As shown in FIG. 2, a shift lever panel 37 is mounted on a vehicle body frame 36 (a bracket and a column mounted on the vehicle body frame also constituting parts of the vehicle body frame). An L-shaped hole 38 is formed in the shift lever panel 37, and the shift lever 41 is inserted into the hole 38. In this embodiment, the first manipulator 27 is inserted into a hole formed on a right side of the shift lever panel 37.

One end of the first wire 31, one end of the second wire 32 and one end of the first cable 33 are connected to the first manipulator 27. By rotating or moving the first manipulator 27, the first wire 31, the second wire 32 and the first cable 33 are operated.

To be more specific, the first manipulator 27 is inserted into a U-shaped groove 39 formed in the shift lever panel 37. Four positions 39A to 39D can be set in the groove 39. By selectively moving the first manipulator 27 to one of these positions 39A to 39D, a drive mode and a differential mode shown in Table explained hereinafter are selected.

TABLE 1

| Position | Drive mode | Front differential | Rear differential |
| --- | --- | --- | --- |
| 39A | four-wheel driving | locked | locked |
| 39B | four-wheel driving | free | Locked |
| 39C | two-wheel driving | free | Locked |
| 39D | two-wheel driving | free | Free |

The first manipulator 27 which changes over a drive mode is arranged on a right side, and the second manipulator (shift lever 41) which changes over a traveling mode (including a parking mode) is arranged on a left side. That is, two manipulators 27, 41 for different purposes of use are operated without interference therebetween, and a differential lock operation is performed as a part of such an operation.

Figure 3:
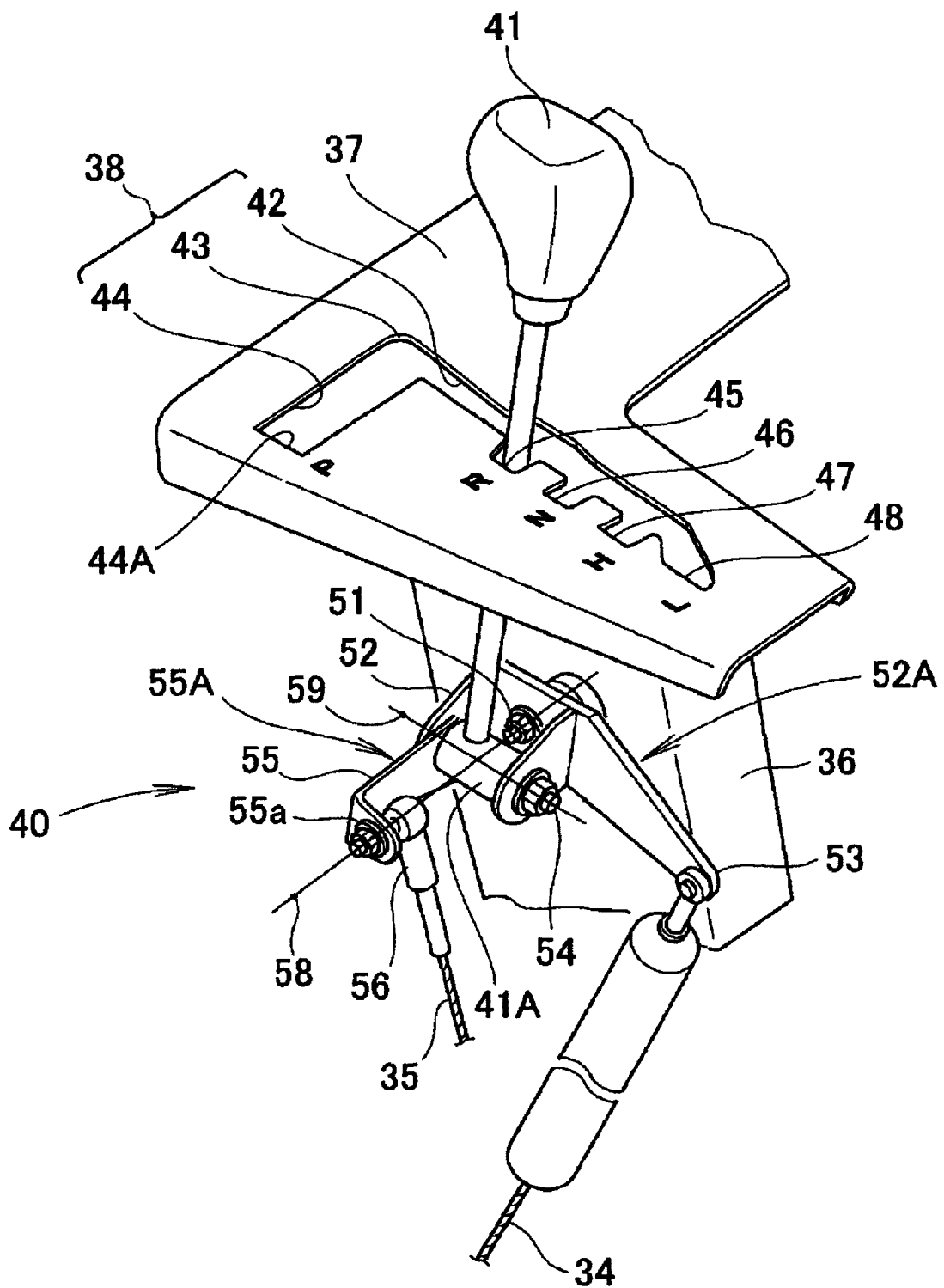
FIG. 3 is a perspective view of a shift lever mechanism.

As shown in FIG. 3, a shift lever mechanism 40 is constituted of: the shift lever panel 37 which is mounted on the vehicle body frame 36; the shift lever 41 which is inserted into the L-shaped hole 38 formed in the shift lever panel 37; and various parts affiliated with the shift lever 41. The L-shaped hole 38 and the various parts are explained in detail hereinafter.

The L-shaped hole 38 is constituted of: a guide groove 42 which extends in the longitudinal direction of the vehicle; and a parking gate 44 which extends in an elongated manner in the vehicle width direction toward a driver side from a corner 43 on a front end of the hole 38. A low-speed forward gate 48, a high-speed forward gate 47, a neutral gate 46, and a reverse gate 45 are formed in the guide groove 42. A driver can set the shift lever 41 at any one of the following: the low-speed forward gate 48, the high-speed forward gate 47, the neutral gate 46, the reverse gate 45, and the parking gate 44. This gate setting action is referred to as a shift operation.

A first rotary member 52A is rotatably supported on the vehicle body frame 36 by a first support pin 51. A U-shaped portion 52 and a first lever portion 53 are formed on the first rotary member 52A. The U-shaped portion 52 of the first rotary member 52A is mounted on the vehicle body frame 36 by the first support pin 51, and one end of the third wire 34 is connected to the first lever portion 53 which extends rearward in the longitudinal direction of the vehicle from the U-shaped portion 52.

A proximal portion 41A of the shift lever 41 is mounted on the U-shaped portion 52 by way of a second support pin 54 which extends in the direction orthogonal to the first support pin 51. A second lever 55 (second rotary member 55A) extends in the vehicle width direction and toward a driver side from the proximal portion 41A. A distal end 55a of the second lever 55 is bent rearward in the longitudinal direction of the vehicle, and one end of the second cable 35 is connected to the distal end 55a by way of a ball plunger 56.

A first axis of rotation 58, which also functions as a center axis of the first support pin 51, passes an area in the vicinity of the center of a ball (FIG. 5, symbol 56b) in the ball plunger 56. A second axis of rotation 59, which also functions as a center axis of the second support pin 54, is arranged orthogonal to and in the vicinity of the first axis of rotation 58.

The more preferred structure is the structure adopted in this embodiment where the first axis of rotation 58, which also functions as the center axis of the first support pin 51, passes the center of the ball (FIG. 5, symbol 56b) in the ball plunger 56, and the second axis of rotation 59, which also functions as the center axis of the second support pin 54, orthogonally intersects with the first axis of rotation 58.

When the shift lever 41 is set at the guide groove 42, the shift lever 41 rotates about the first axis of rotation 58. As a result, the third wire 34 is pulled so that the transmission (FIG. 1, symbol 12) performs switching corresponding to a traveling mode. When the shift lever 41 arrives at the corner 43, the shift lever 41 arrives at an entrance of the parking gate 44.

Figure 4:
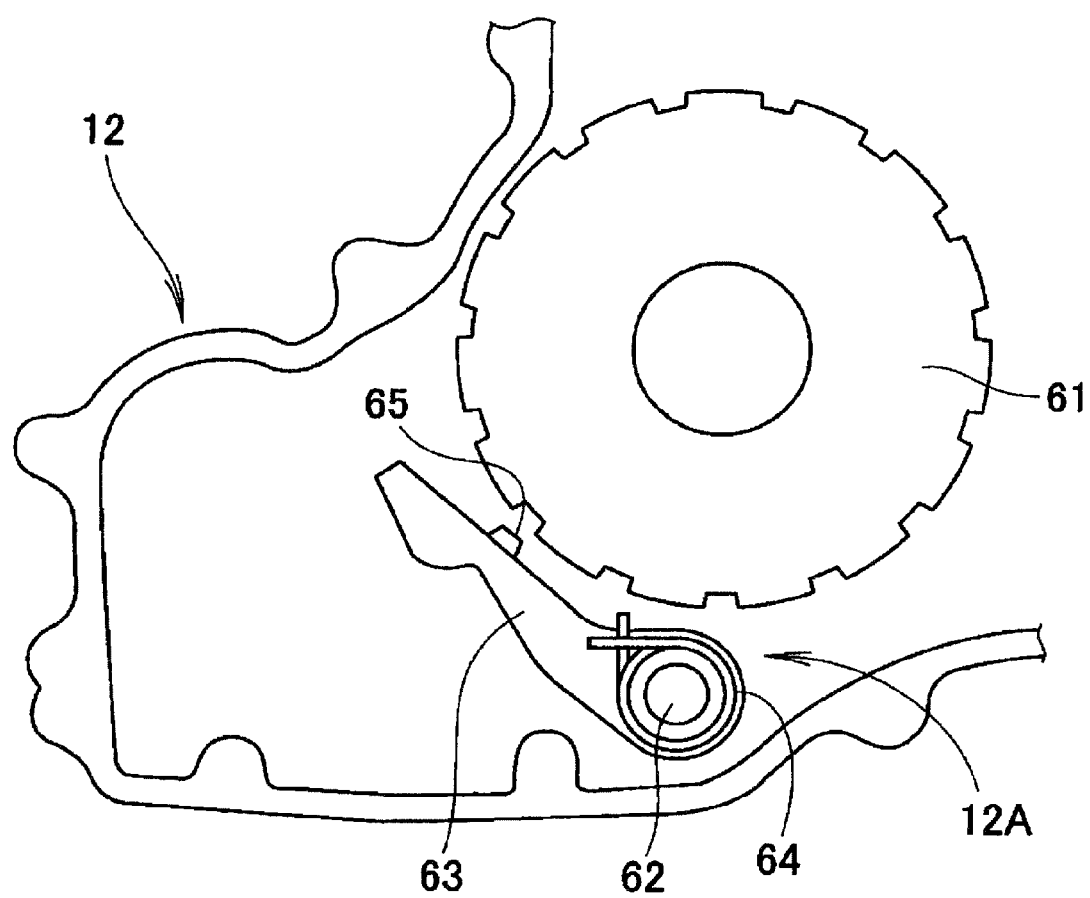
FIG. 4 is a constitutional view of a part of a transmission.

FIG. 4 is a view showing a portion of the transmission. The transmission 12 includes a drive force transmission shut-off mechanism 12A which regulates the rotation of the propeller shaft 14. As the drive force transmission shut-off mechanism 12A regulates the rotation of the propeller shaft 14, the rotation of the drive shafts 19L, 19R is also regulated so that the rotation of the rear drive wheels 21L, 21R is also regulated.

The drive force transmission shut-off mechanism 12A includes: a parking gear 61; a parking pole shaft 62 rotated by the third wire 34; a parking pole 63 rotated by the parking pole shaft 62; and a return spring 64 biasing the parking pole 63 to a non-parking side. In FIG. 3, when the shift lever 41 arrives at the entrance of the parking gate 44, the parking pole 63 is rotated against the return spring 64 shown in FIG. 4 so that a pawl 65 meshes with the parking gear 61.

As a result of this operation, a first parking state is acquired. In the parking state, the rotation of the propeller shaft 14 connected to the transmission 12 is also regulated and hence, the propeller shaft 14 is brought into a locked state.

As shown in FIG. 2, a torsion spring 67 is mounted around the second support pin 54, and the torsion spring 67 biases the shift lever 41 in the direction in which the shift lever 41 is separated from the corner 43. That is, due to a biasing action of the torsion spring 67, the shift lever 41 is pushed to a deep portion of any one of the following: the low-speed forward gate 48, the high-speed forward gate 47, the neutral gate 46, the reverse gate 45, and the parking gate 44 shown in FIG. 3.

Next, the manner of operation of the parking gate 44 is explained.

Figure 5:
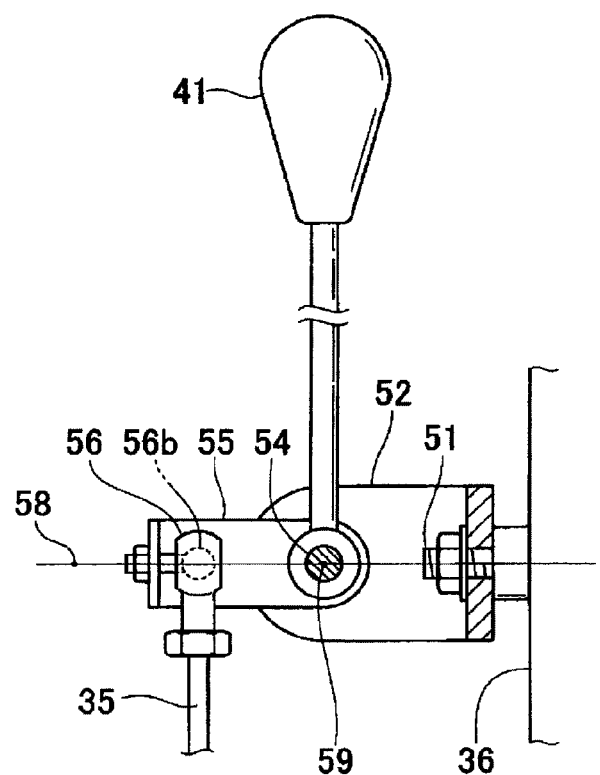
FIG. 5 is an operational view of the second manipulator.

FIG. 5 shows a state where the shift lever 41 is at the corner (FIG. 3, symbol 43). The shift lever 41 is rotated about the second axis of rotation 59 toward a vehicle body center side from such a state.

Figure 6:
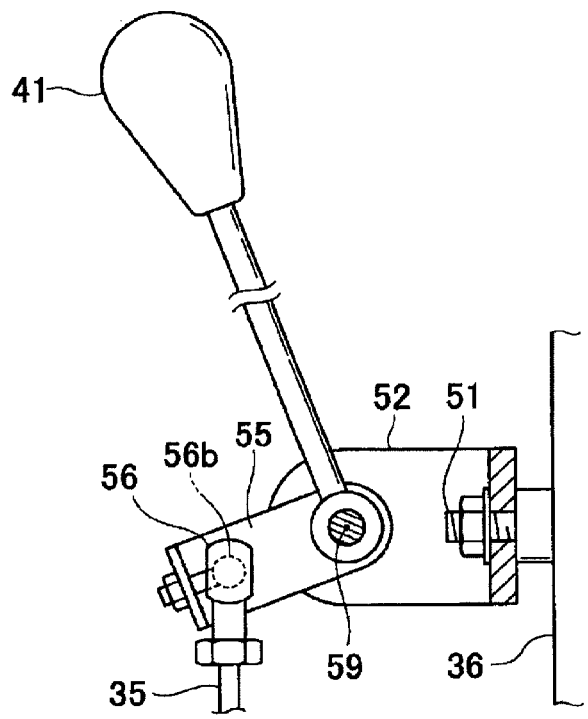
FIG. 6 is an operational view of the second manipulator.

FIG. 6 shows the shift lever 41 after being rotated. The second cable 35 is pushed downward so that a second parking state can be acquired. The second parking state is described in detail later.

In FIG. 5, by rotating the shift lever 41 in the direction passing through the paper which the drawing is on (in the longitudinal direction of the vehicle), one traveling mode is selected from a group of traveling modes consisting of a low-speed traveling mode, a high-speed traveling mode, a neutral mode, a reversing mode, and a first parking state. In performing such a mode selecting operation, the U-shaped portion 52 is merely rotated about the first axis of rotation 58 and hence, the ball 56b in the ball plunger 56 is always disposed on the first axis of rotation 58. As a result, the second lever 55 is not rotated and hence, the second cable 35 is neither pushed nor pulled.

On the other hand, when the second lever 55 is rotated about the second axis of rotation 59 as shown in FIG. 6, the U-shaped portion 52 is held in a stopped state and hence, a traveling mode is not influenced by the rotation of the second lever 55.

To summarize the movements of the respective members caused by the operation of the shift lever 41 for bringing the vehicle into a parking state, firstly, when the shift lever 41 is operated to the corner 43 along the guide groove 42, the first rotary member 52A is rotated so that the third wire 34 is pulled. As a result, the parking pole 63 of the drive force transmission shut-off mechanism 12A is rotated and hence, the pawl 65 is engaged with the parking gear 61 whereby the transmission of power is shut off.

When the shift lever 41 is further operated toward the parking gate 44 side on a left side, the second lever 55 (second rotary member 55A) is rotated so that the second cable 35 is pulled. Accordingly, an arm 97 is rotated, and a slide member 91 is operated due to the rotation of the arm 97 and hence, the differential lock mechanism 90 is brought into a locked state.

Accordingly, when the shift lever 41 is operated to an end portion 44A of the parking gate 44, it is possible to bring the drive force transmission shut-off mechanism 12A into an ON state (shut-off state), and it is also possible to bring the differential lock mechanism 90 into a locked state.

As has been described heretofore, the transmission 12 and the differential lock mechanism 90 shown in FIG. 1 can be operated by one shift lever 41. The differential gear 70 provided with a rear differential lock mechanism on which the differential lock mechanism 90 is mounted is explained in detail hereinafter.

Figure 7:
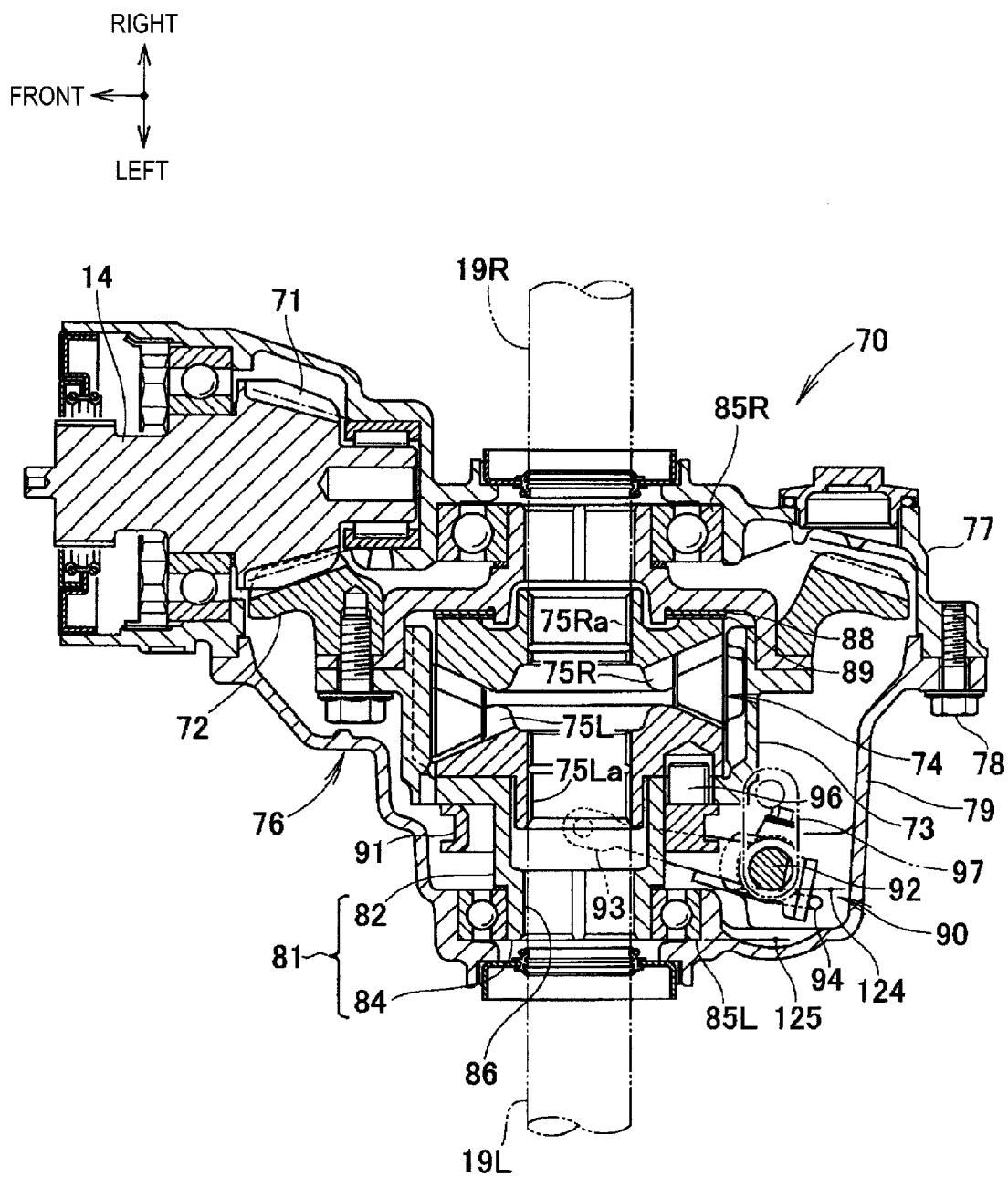
FIG. 7 is a planar cross-sectional view of a differential gear provided with a differential lock mechanism.

As shown in FIG. 7, the differential gear 70 provided with a rear differential lock mechanism includes: a pinion gear 71 mounted on an end portion of the rear propeller shaft 14; a ring gear 72 meshing with the pinion gear 71; a differential casing 73 rotated together with the ring gear 72 and forming a differential machine chamber therein; the differential mechanism 74 housed in the differential casing 73 and capable of making a difference in rotational speed between the left and right wheels; left and right output-side cams 75L, 75R constituting portions of the differential mechanism 74 and transmitting power transmitted to the ring gear 72 to the drive shafts 19L, 19R respectively; and a gear casing 76 housing the ring gear 72 and the differential casing 73 therein.

A washer (shim) 88 and a disc spring 89 are interposed between the ring gear 72 and the right output-side cam 75R, and the right output-side cam 75R is biased to a left output-side cam 75L side.

Spline grooves 75La are formed on the left output-side cam 75L, and one end of the drive shaft 19L is fitted into the spline groove 75La. In the same manner, spline grooves 75Ra are formed on the right output-side cam 75R, and one end of the drive shaft 19R is fitted into the spline grooves 75Ra.

The gear casing 76 is constituted of: a first casing half body 77 rotatably supporting the pinion gear 71; and a second casing half body 79 connected to the first casing half body 77 using bolts 78. The differential lock mechanism 90 is housed in the second casing half body 79.

The differential casing 73 is rotatably mounted on the gear casing 76 by means of two bearings 85L, 85R. To be more specific, a portion of the differential casing 73 away from the ring gear 72 is formed into a cylindrical shaft 81, and the cylindrical shaft 81 has a diameter thereof narrowed toward a distal end thereof thus forming a large-diameter portion 82 and a small-diameter portion 84. The small-diameter portion 84 is supported on the gear casing 76 by way of the bearing 85L.

The slide member 91, which is one of the constitutional elements of the differential lock mechanism 90, is fitted on the large-diameter portion 82 in an axially movable manner.

A rotary shaft 92 is rotatably mounted on the second casing half body 79 at a position in the vicinity of the bearing 85L. An arm 97 which constitutes a switching means is mounted on one end of the rotary shaft 92, a shift fork 93 is mounted on a middle portion of the rotary shaft 92, and the shift fork 93 is fitted in the slide member 91.

The rotary shaft 92 is biased in the clockwise direction in the drawing by a spring (preferably, torsion spring) 94 mounted on the second casing half body 79 and hence, the shift fork 93 slides the slide member 91 toward a differential casing 73 side. As a result, a pin 96 mounted on the slide member 91 is engaged with the left output-side cam 75L and hence, the rotation of the left output-side cam 75L is prevented by the pin 96 whereby the differential mechanism 74 is brought into a non-differential state, that is, a differential locked state.

In a state where an external force is not applied to the rotary shaft 92, a differential locked state is always maintained due to an action of the torsion spring 94.

When the arm 97 is tilted in the counterclockwise direction in the drawing by an external force, the rotary shaft 92 is rotated and hence, the shift fork 93 is tilted. Accordingly, the slide member 91 moves in the direction away from the differential casing 73 and hence, the pin 96 is removed from the left output-side cam 75L. As a result, the left output-side cam 75L becomes rotatable and hence, the differential mechanism 74 is brought into a differential state.

Hereinafter, the mechanism for tilting the arm 97 is explained in detail.

Figure 8:
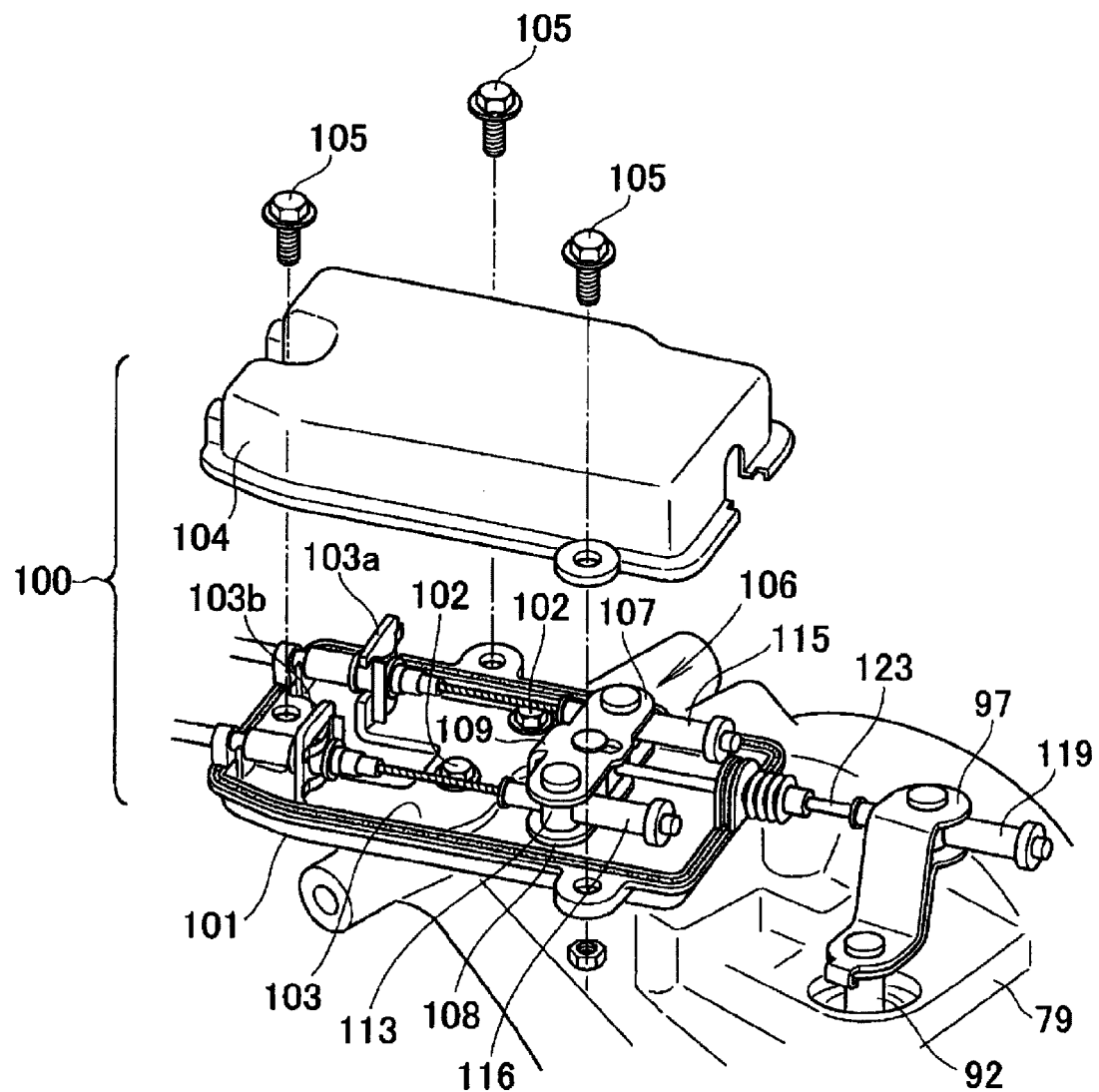
FIG. 8 is a perspective view of a collecting member and a casing.

As shown in FIG. 8, one end of the rotary shaft 92 projects from the second casing half body 79, and the arm 97 is mounted on the one projecting end.

A protective casing body 101 is fastened to the second casing half body 79 together with a cable stay 103 using bolts 102, 102. The protective casing body 101 is covered with a lid 104, and the lid 104 is fixed to the protective casing body 101 using bolts 105. That is, the protective casing body 101, the lid 104 and the bolt 105 form a protective casing 100.

Figure 9:
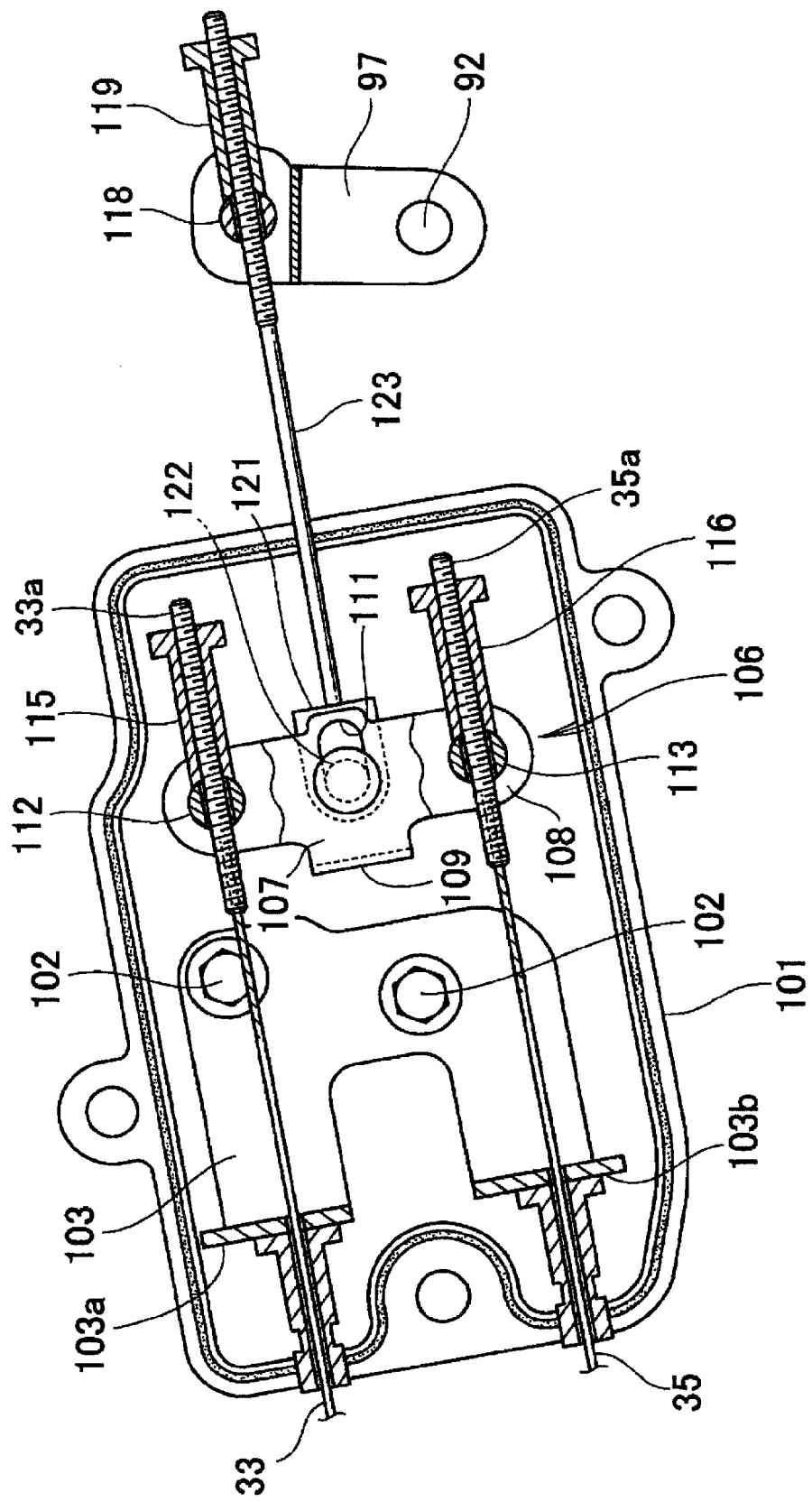
FIG. 9 is a plan view of the collecting member and a cable stay.

In FIG. 9, the cable stay 103 is a metal-made pressed product, and has a first wall 103a and a second wall 103b. The first wall 103a guides the first cable 33 while supporting the first cable 33. The second wall 103b guides the second cable 35 while supporting the second cable 35. In the protective casing body 101, a collecting member 106 is housed together with the cable stay 103.

As shown in FIG. 8, the collecting member 106 is a pressed product, and is constituted of: an upper plate portion 107 having an I shape as viewed in a plan view; a lower plate portion 108 having an I shape as viewed in a plan view; and a bridge portion 109 which connects the upper plate portion 107 and the lower plate portion 108 to each other.

As shown in FIG. 9, in the collecting member 106, an elongated hole 111 is formed in a center portion of the upper plate portion 107 and a center portion of the lower plate portion 108 respectively. First and second blocks 112, 113 are provided between the upper plate portion 107 and the lower plate portion 108 with the elongated holes 111 sandwiched between the first and second blocks 112, 113, wherein the first block 112 is arranged on a right side of the elongated holes 111 and the second block 113 is arranged on a left side of the elongated holes 111.

The first block 112 is a columnar piece having a hole through which the first cable 33 passes. A male threaded portion 33a is formed on one end of the first cable 33, and a first adjuster 115 is threadedly engaged with the male threaded portion 33a.

A distal end of the first adjuster 115 is arcuately notched and hence, the rotation of the first adjuster 115 can be stopped by bringing the distal end of the first adjuster 115 into contact with the first block 112. By rotating the first adjuster 115 by 180° per unit, a length of the first cable 33 can be adjusted.

In the same manner, the second block 113 is a columnar piece having a hole through which the second cable 35 passes. A male threaded portion 35a is formed on one end of the second cable 35, and a second adjuster 116 is threadedly engaged with the male threaded portion 35a.

A distal end of the second adjuster 116 is arcuately notched and hence, the rotation of the second adjuster 116 can be stopped by bringing the distal end of the second adjuster 116 into contact with the second block 113. By rotating the second adjuster 116 by 180° per unit, a length of the second cable 35 can be adjusted.

A third block 118 and a third adjuster 119 are mounted also on the arm 97.

A slider pin 122 which extends from a slider 121 is movably mounted in the elongated hole 111 formed in the collecting member 106. A rod 123 which forms a collecting transmission member is extended from the slider 121, and the rod 123 passes through the third block 118. In such a state, the third adjuster 119 is threadedly engaged with the rod 123. In the drawing, the slider pin 122 is arranged at an end of the elongated hole 111 on a cable stay 103 side.

The position and the posture of the collecting member 106 with reference to the cable stay 103 can be adjusted by the first and second adjusters 115, 116. Further, a length of the first cable 33 can be adjusted by the first adjuster 115, and a length of the second cable 35 can be adjusted by the second adjuster 116.

An angle of the arm 97 can be adjusted by the third adjuster 119.

These plural adjustments can be collectively carried out around the protective casing body 101 thus enhancing the maintenance property of the differential gear. Since the protective casing body 101 is covered with the lid (FIG. 8, symbol 104), there exists no possibility that a foreign substance such as mud will get deposited on the cable stay 103 and the collecting member 106 and hence, the movement of the first and second cables 33, 35 becomes smooth and, at the same time, the collecting member 106 can be moved smoothly.

Next, the manner of operation of the collecting member 106 is explained.

When the first manipulator 27 is tilted to the posture shown in FIG. 2, the first cable 33 is slackened and when the second cable 35 is slackened, the collecting member 106 takes the configuration shown in FIG. 9.

In FIG. 2, when only the first manipulator 27 is tilted rightward in the drawing, the first cable 33 is pulled. The second cable 35 is kept in a slackened state.

Figure 10A:
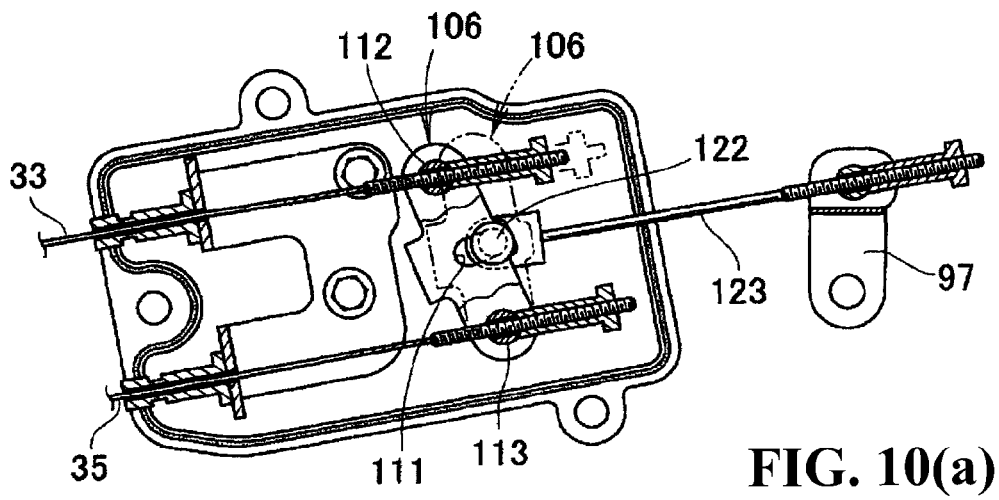
FIG. 10 is an explanatory view for explaining the manner of operation of the collecting member, where FIG. 10(*a*) is a state in which a first cable is pulled, FIG. 10(*b*) is a state in which a second cable is pulled, and FIG. 10(*c*) is a state in which both a first cable and second cable are pulled.

When the first cable 33 is pulled, as shown in FIG. 10(a), the collecting member 106 indicated by an imaginary line is rotated in the counterclockwise direction in the drawing using the second block 113 as the center of rotation, and takes the posture indicated by a solid line. Then, the elongated hole 111 moves such that the slider pin 122 moves to an end of the elongated hole 111 on an arm 97 side. Since the slider pin 122 merely moves within a range of the elongated hole 111, the arm 97 is not yet tilted.

In FIG. 2, when only the second manipulator 41 is tilted rightward in the drawing, the second cable 35 is pulled. The first cable 33 is kept in a slackened state.

Figure 10B:
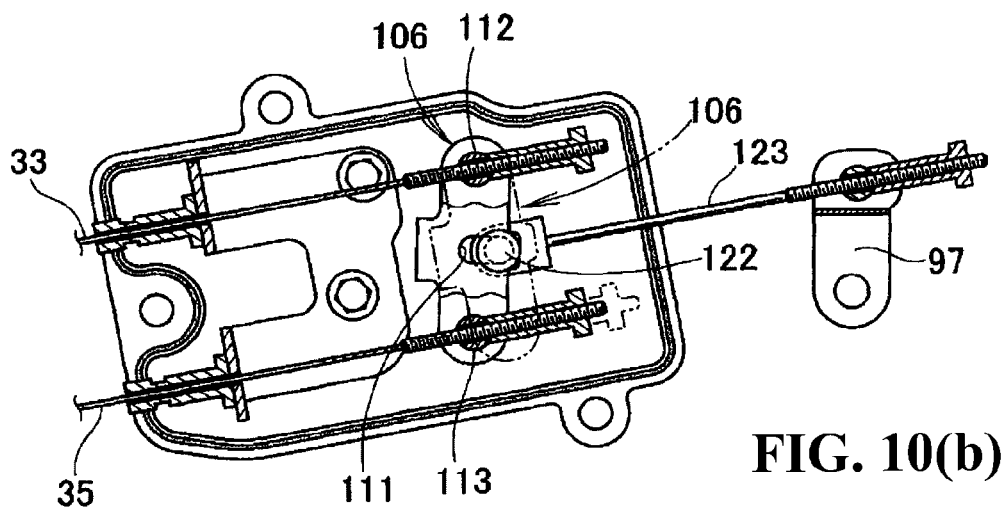

When the second cable 35 is pulled, as shown in FIG. 10(b), the collecting member 106 indicated by an imaginary line is rotated in the clockwise direction in the drawing using the first block 112 as the center of rotation, and takes the posture indicated by a solid line. Then, the elongated hole 111 moves such that the slider pin 122 moves to an end of the elongated hole 111 on an arm 97 side. Since the slider pin 122 merely moves within a range of the elongated hole 111, the arm 97 is not yet tilted.

Accordingly, even when the first cable 33 or the second cable 35 is pulled by only one of either the first manipulator (FIG. 1, symbol 27) or the second manipulator (FIG. 1, symbol 41), the arm 97 is not tilted.

On the other hand, in FIG. 2, when both the first manipulator 27 and the second manipulator 41 are tilted rightward in the drawing, the first cable 33 and the second cable 35 are pulled.

Figure 10C:
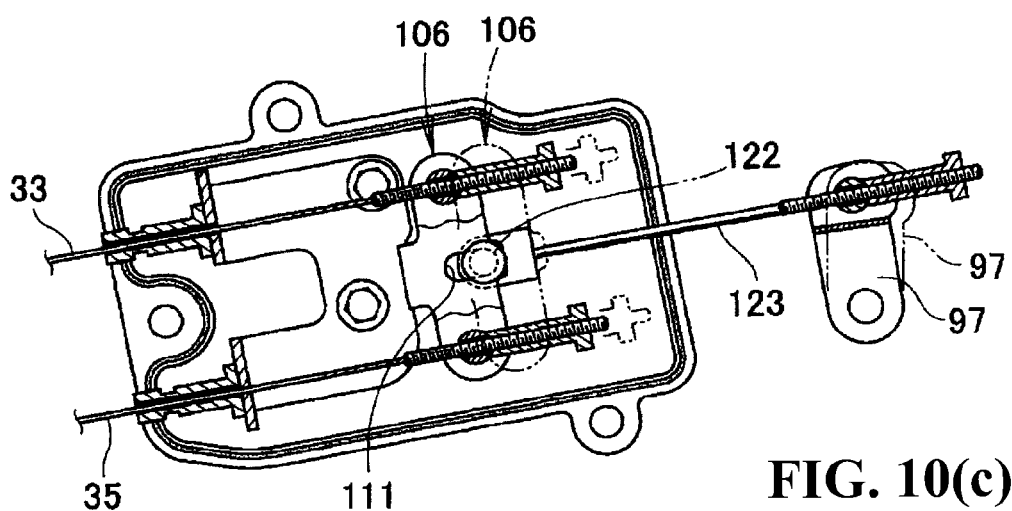

When the first cable 33 and the second cable 35 are pulled, as shown in FIG. 10(c), the collecting member 106 indicated by an imaginary line moves to a position indicated by a solid line. Due to such a movement, the collecting member 106 tilts the arm 97 by way of the rod 123 from the position indicated by an imaginary line to the position indicated by a solid line. As a result, the pin 96 shown in FIG. 7 is removed from the left output-side cam 75L and hence, the differential mechanism 74 is brought into a differential state (differential lock released state).

In FIG. 7, the rotary shaft 92 is arranged in the vicinity of one bearing 85L. To be more specific, at least one of a first tangent line 124 and a second tangent line 125 which orthogonally intersect with the drive shaft 19L and are tangent to two side surfaces of the bearing 85L intersects with the rotary shaft 92.

As has been described above, although the rotary shaft 92 is mounted on the second casing half body 79, the projection of the second casing half body 79 can be suppressed thus preventing increasing the size of the differential gear 70 provided with a rear differential lock mechanism and the differential lock mechanism 90.

Further, in an attempt to directly connect the first and second cables 33, 35 to the arm 97 in FIG. 9, the arm 97 becomes increased in size, and a shape of the arm 97 becomes complicated. In this respect, by interposing the collecting member 106 between the cables and the arm, it is sufficient to merely connect the rod 123 to the arm 97 so that miniaturization and the simplification of the arm 97 can be realized.

In this embodiment, the elongated holes 111 are formed in the collecting member 106. However, the elongated holes 111 may be formed in the arm 97. Although the arm 97 becomes slightly increased in size in this case, miniaturization of the collecting member 106 can be realized.

Next, a modification of the differential gear provided with a differential lock mechanism is explained.

Figure 11:
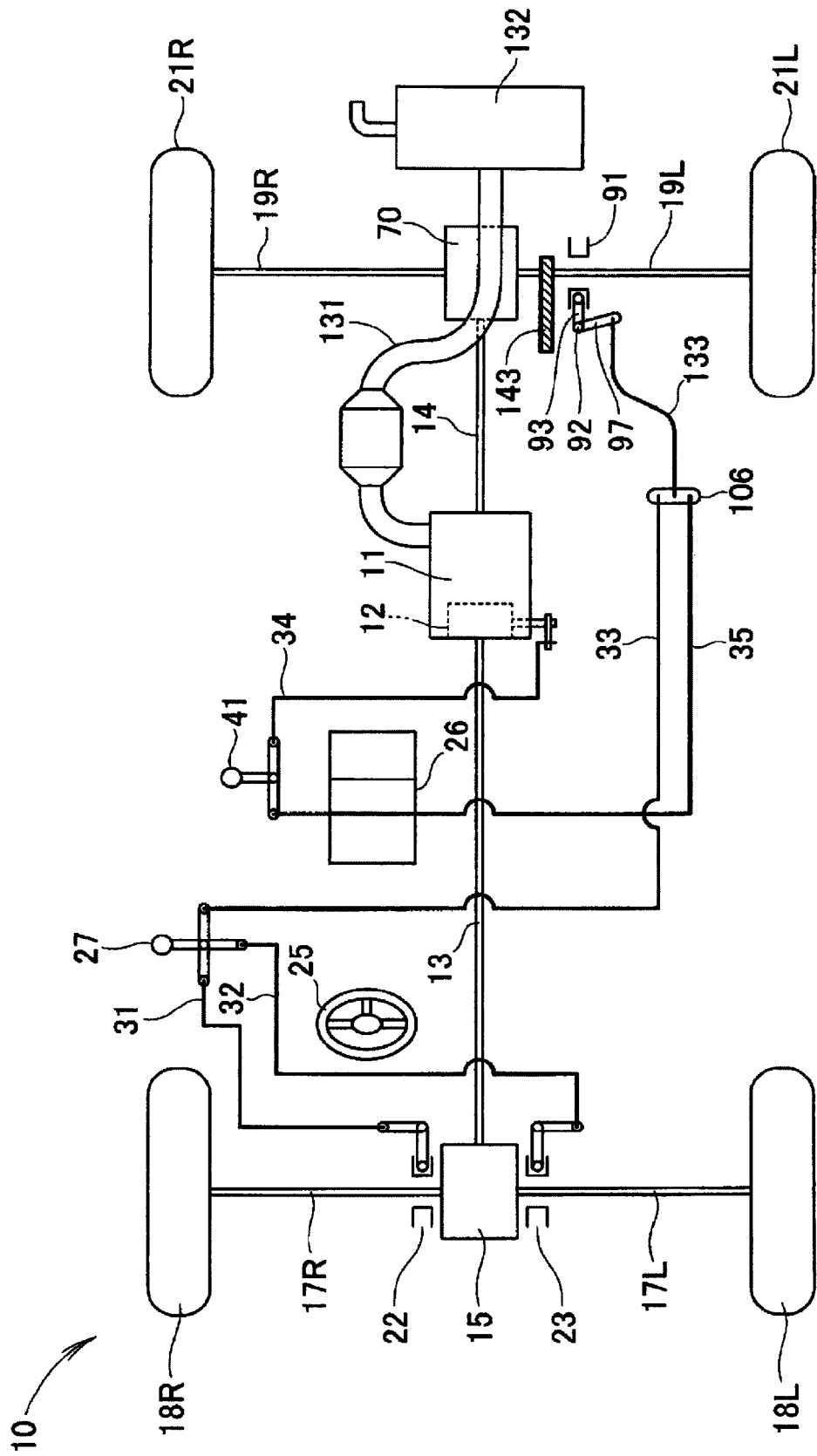
FIG. 11 is a plan view (schematic view) showing a drive system of a vehicle according to a modification.

As shown in FIG. 11, an exhaust pipe 131 extending from the power unit 11 extends toward a rear side of the vehicle while passing above the differential gear 70 provided with a rear differential lock mechanism, and is connected to a muffler 132.

The collecting member 106 is arranged away from the differential gear 70 provided with a rear differential lock mechanism which incorporates the differential mechanism (FIG. 7, symbol 74) therein, and is also arranged at a position sufficiently away from the exhaust pipe 131 which is a high-temperature member. Accordingly, a switching means 97 (hereinafter referred to as "arm 97") and the collecting member 106 are connected to each other by way of a third cable 133. The third cable 133 has a sufficient length and also has excellent flexibility.

Other constitutional elements of the differential gear 70 provided with a rear differential lock mechanism are merely indicated by symbols used in FIG. 1, and the detailed explanation of such constitutional elements is omitted.

Figure 12:
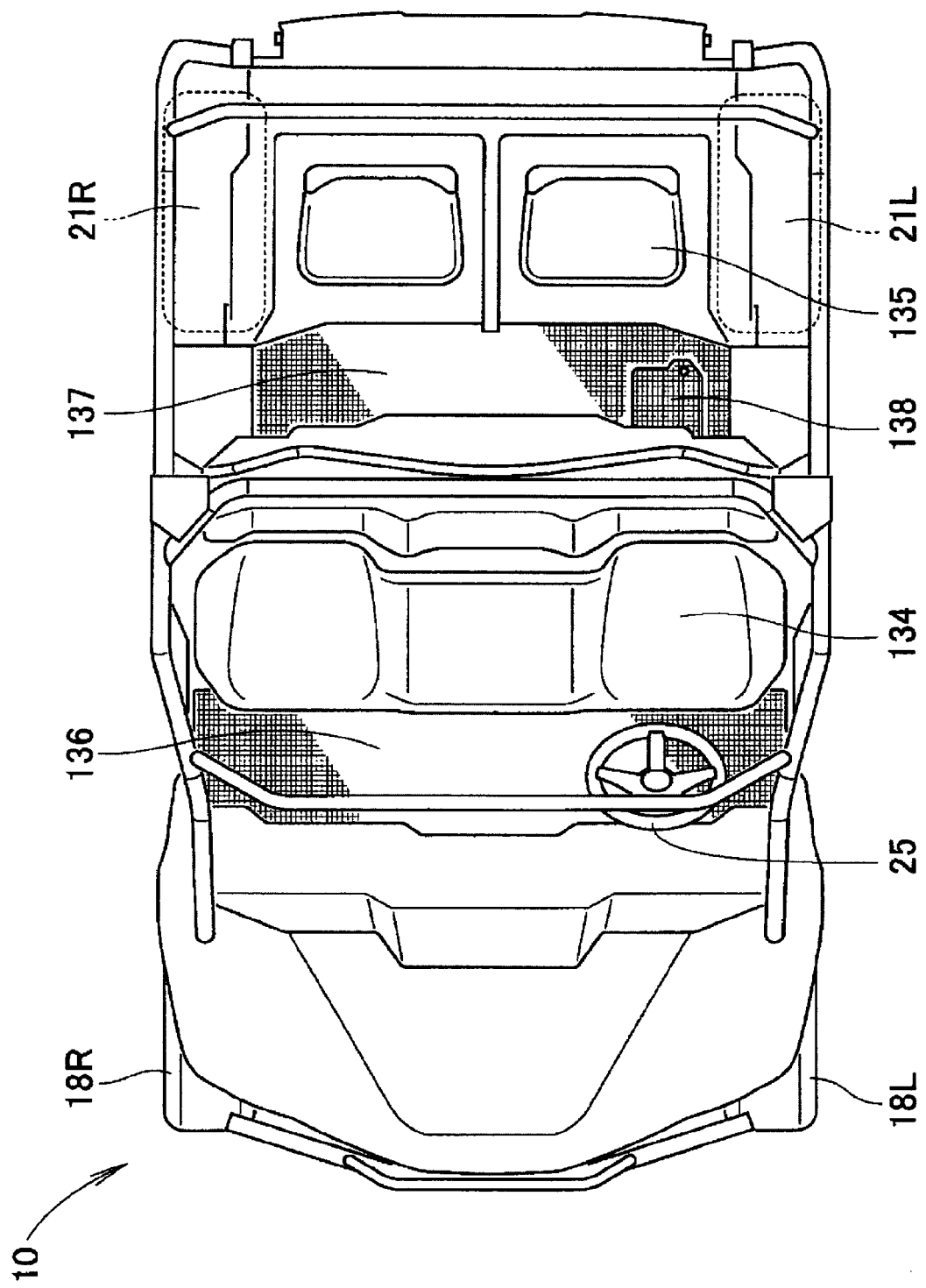
FIG. 12 is a plan view of the vehicle.

As shown in FIG. 12, a vehicle 10 is an all-terrain vehicle which includes: front wheels 18L, 18R; rear drive wheels 21L, 21R; a front seat 134 on which three passengers can be seated; a rear seat 135 on which two passengers can be seated; a foot rest floor 136 arranged in front of the front seat 134; and a foot rest floor 137 arranged in front of the rear seat 135.

An inspection lid 138 is mounted on the foot rest floor 137 in an openable/closeable manner.

Figure 13:
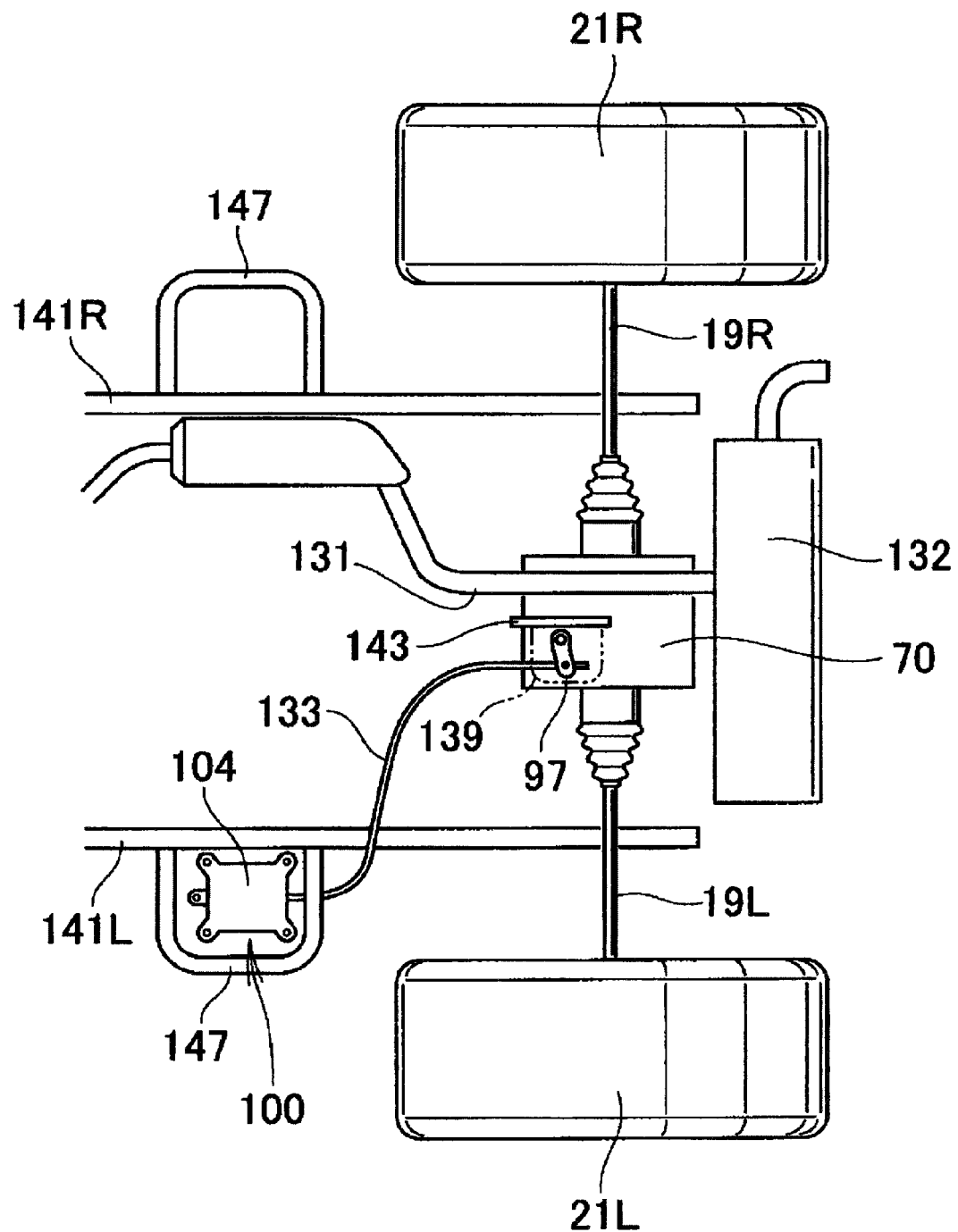
FIG. 13 is a plan view showing a differential gear provided with a rear differential lock mechanism and an area around the differential gear.

As shown in FIG. 13, vehicle body frames 141L, 141R, the exhaust pipe 131, the muffler 132, and the differential gear 70 provided with a rear differential lock mechanism are arranged below the foot rest floor 137. The arm 97 attached to the differential gear 70 provided with a rear differential lock mechanism is arranged between the vehicle body frame 141L and the vehicle body frame 141R. The arm 97 is arranged on a left side of the exhaust pipe 131 in the vehicle width direction, and a heat shield panel 143 is disposed between the arm 97 and the exhaust pipe 131.

The structure of part of FIG. 13 is explained by reference to FIG. 14 to FIG. 16.

Figure 14:
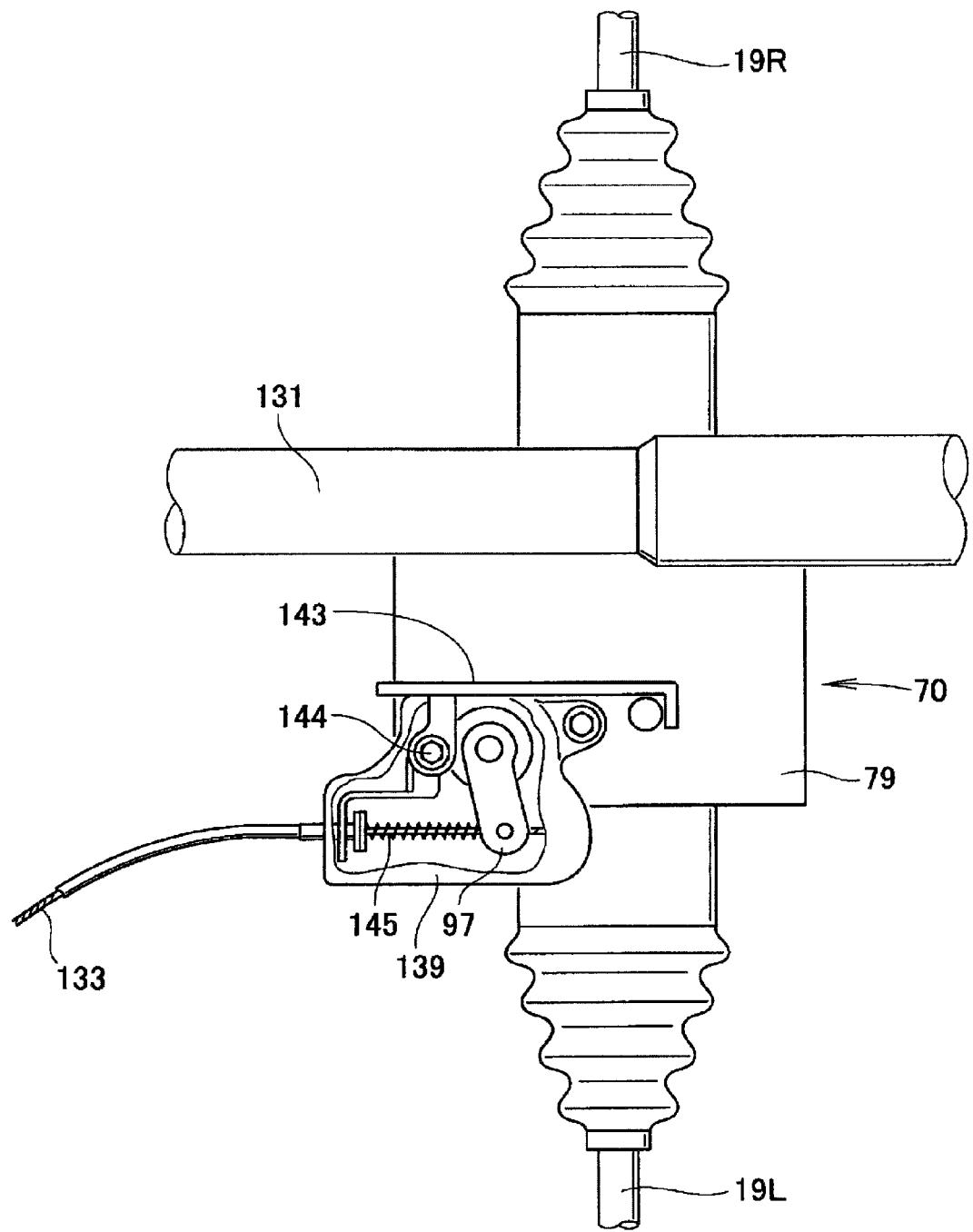
FIG. 14 is an enlarged view of a part (including an arm 97) in FIG. 13.

As shown in FIG. 14, to ensure the smooth operation of the arm 97 and a spring 145, the arm 97 and the spring 145 are protected by a dustproof cover 139. To show the inside of the dustproof cover 139, a center portion of the dustproof cover 139 is described in a see-through manner. The dustproof cover 139 has a complicated shape and hence, it is preferable to form the dustproof cover 139 using a resin. However, the dustproof cover 139 made of a resin has a problem on heat resistance.

Accordingly, the heat shield panel 143 is disposed in a raised manner between the exhaust pipe 131 and the arm 97. The heat shield panel 143 is mounted on a second casing half body 79 of the differential gear 70 provided with a rear differential lock mechanism using bolts 144. Heat emitted from the high temperature exhaust pipe 131 is shielded by the heat shield panel 143. Accordingly, it is possible to adopt the resin-made dustproof cover 139.

Figure 15:
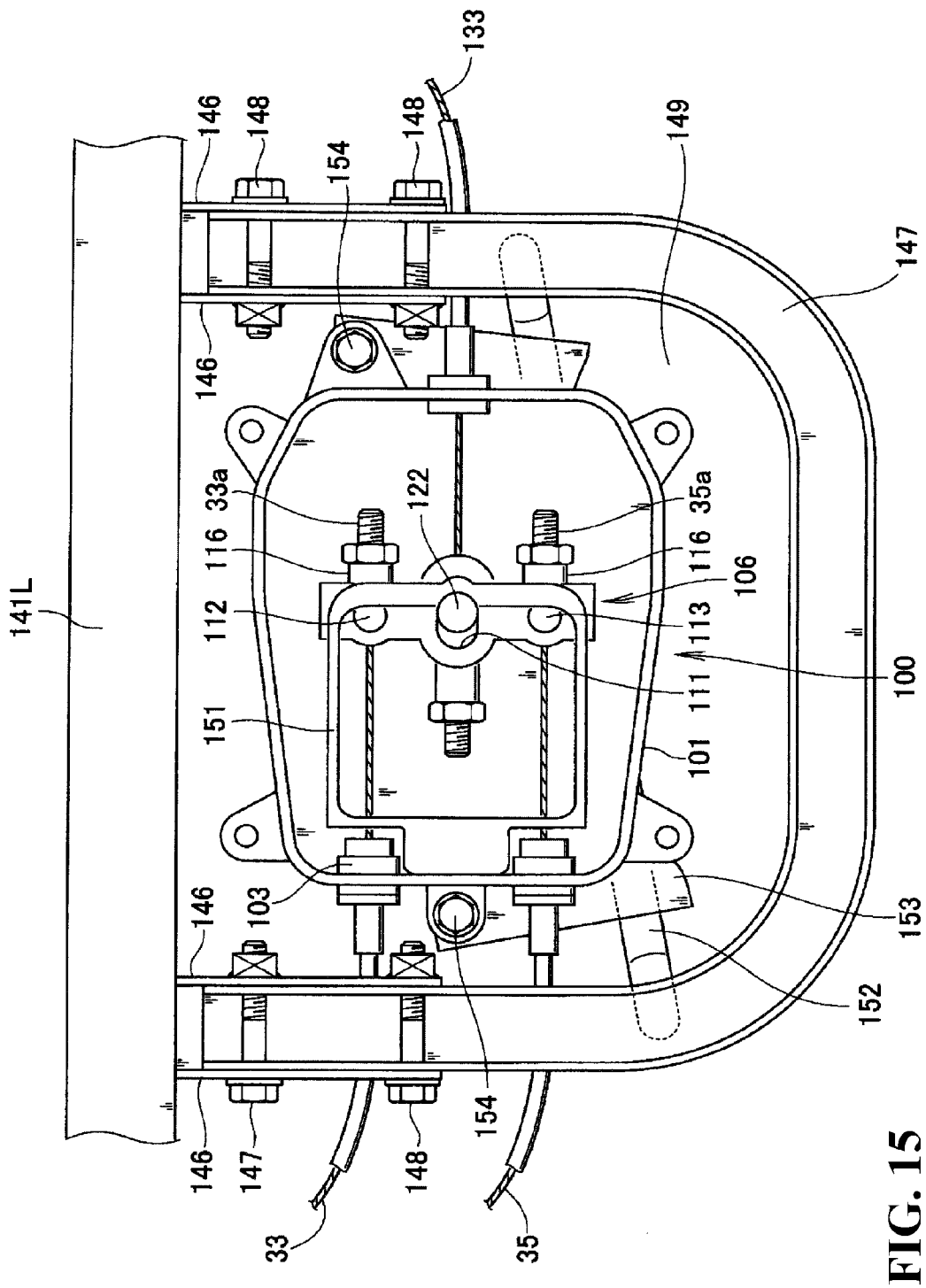
FIG. 15 is an enlarged view of a part (including a collecting member 106) in FIG. 13.

As shown in FIG. 15, plates 146 extend outwardly from the vehicle body frame 141L in the vehicle width direction, a proximal portion of the U-shaped frame 147 is inserted between two plates 146, 146, and the U-shaped frame 147 is fixed to the plates 146, 146 using bolts 148, 148. A region 149 surrounded by the U-shaped frame 147 and the vehicle body frame 141L can be visually recognized from above by removing the inspection lid (FIG. 12, symbol: 138).

A casing 100 is arranged in the region 149. By removing a lid (indicated by symbol 104 in FIG. 3), the inside of a protective casing body 101 can be observed from above. In the inside of the protective casing body 101A, a cable stay 103 which supports the first and second cables 33, 35 in a movable manner and a collecting member 106 which collects the first to third cables 33, 35, 133 together are arranged. Other constitutional elements have been explained by reference to FIG. 9 and hence, these constitutional elements are indicated by the symbols used in FIG. 9, and the detailed explanation of such constitutional elements is omitted.

However, this modification includes a stopper member 151 not shown in FIG. 9 as an additional constitutional element. The stopper member 151 is a frame body extending from the cable stay 103, and restricts a position of a slider pin 122 on a pulling side.

The protective casing body 101 guides the collecting member 106 and, at the same time, plays a role of protecting the collecting member 106 from muddy water, scattered pebbles and dust. However, when the protective casing or the lid 104 which covers the protective casing body is made of a resin, it is necessary to take a countermeasure against heat.

As shown in FIG. 13, by adopting the third cable 133 having sufficient flexibility and a sufficient length, the casing 100 can be arranged at a position sufficiently away from the exhaust pipe 131 which is a high-temperature member.

Figure 16:
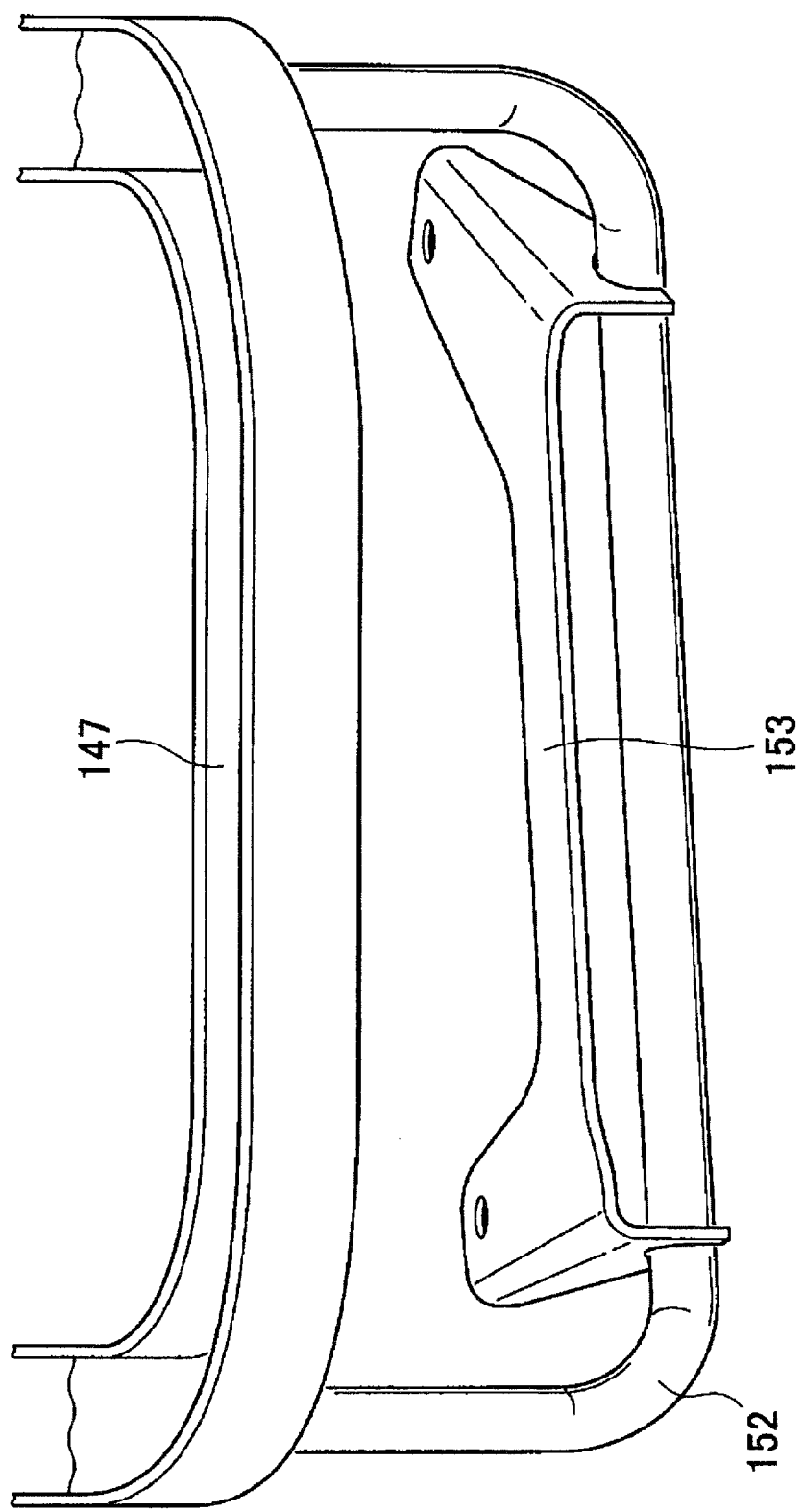
FIG. 16 is a side view of a U-shaped frame shown in FIG. 15.

As shown in FIG. 16, a U-shaped pipe 152 having a U-shape as viewed in a side view is brought into contact with the U-shaped frame 147 having a U-shape as viewed in a plan view from below, and the U-shaped pipe 152 is welded to the U-shaped frame 147. A casing bracket 153 which is a pressed product formed by pressing a metal plate is welded to the U-shaped pipe 152. A protective casing half body 101 shown in FIG. 15 is placed on the casing bracket 153, and is fixed to the casing bracket 153 using bolts 154, 154.

Although the invention is preferably applicable to an all-terrain vehicle, there exist no problems in applying the invention to vehicles in general.

The invention is preferably applicable to an all-terrain vehicle.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A differential mechanism regulating device, comprising:
    a differential mechanism which transmits a drive force inputted from a power unit to left and right drive shafts and which generates a difference in rotational speed between left and right wheels connected to the left and right drive shafts;
    a differential lock mechanism attached to said differential mechanism and configured to lock said differential mechanism into a non-differential state;
    a switching means attached to said differential lock mechanism, said switching means configured to switch a state of said differential lock mechanism between an operation state and a release state;
    a first cable connected at a first end of said first cable to a first manipulator, the first manipulator being configured to actuate said switching means via said first cable;
    a second cable connected at a first end of said second cable to a second manipulator, the second manipulator being configured to actuate said switching means via said second cable;
    a collecting member provided between said first and second cables and said switching means, a second end of said first cable and a second end of said second cable being connected to said collecting member; and
    a collecting transmission member which connects said collecting member and said switching means to each other,
    wherein an operational force is transmitted from the first manipulator and the second manipulator to the switching means via said collecting member and said collecting transmission member.

2. The differential mechanism regulating device according to claim 1, wherein said differential gear further comprises:
    a cable stay which supports first ends of said first and second cables, and
    a casing which houses said cable stay and said collecting member,
    wherein said casing is connected to said differential mechanism via a third cable disposed between said casing and said differential mechanism.

3. A vehicle, comprising:
    said differential mechanism regulating device according to claim 2,
    wherein an inspection lid is mounted on a foot rest floor on which a passenger places his feet in an openable/closable manner, and
    wherein said casing is disposed in a region below the inspection lid.

4. The vehicle according to claim 3,
    wherein said switching means, to which said third cable is connected, and an exhaust pipe are disposed above said differential mechanism and between left and right vehicle body frames,
    wherein said switching means is disposed on a left side or a right side of said exhaust pipe in a vehicle width direction of the vehicle, and
    wherein a heat shield panel, which shields heat emitted to said switching means from said exhaust pipe, is arranged between said exhaust pipe and said switching means.

5. A vehicle, comprising:
    said differential mechanism regulating device according to claim 2,
    wherein said switching means, to which said third cable is connected, and an exhaust pipe are disposed above said differential mechanism and between left and right vehicle body frames,
    wherein said switching means is disposed on a left side or a right side of said exhaust pipe in a vehicle width direction of the vehicle, and
    wherein a heat shield panel, which shields heat emitted to said switching means from said exhaust pipe, is arranged between said exhaust pipe and said switching means.

6. The differential mechanism regulating device according to claim 1,
    wherein an elongated hole is formed in said collecting member or said switching means, and
    wherein when only one of the first and second manipulators is operated, said elongated hole prevents said switching means from being operated and allows said collecting member to move.

7. The differential mechanism regulating device according to claim 6, wherein the first manipulator is a switching lever which changes over a drive mode, and the second manipulator is a switching lever which is operated during parking of a vehicle.

8. The differential mechanism regulating device according to claim 1, wherein said differential gear further comprises:
    a cable stay which supports the first ends of said first and second cables, and
    a casing which houses said cable stay and said collecting member, said casing being mounted on an upper surface of a gear casing which houses said differential mechanism.

9. The differential mechanism regulating device according to claim 8, wherein said differential mechanism further comprises:
    a cylindrical shaft through which one of the left and right drive shafts penetrates, said cylindrical shaft being housed in said gear casing,
    a bearing which supports said cylindrical shaft, and
    a rotary shaft which is rotated by said switching means,
    wherein said cylindrical shaft, said bearing and said rotary shaft are mounted on said gear casing, and
    wherein said bearing is arranged in the vicinity of said rotary shaft and overlaps with said rotary shaft in a vehicle width direction of a vehicle.

10. The differential mechanism regulating device according to claim 1, wherein said switching means includes a spring which always biases said differential mechanism to a non-differential state side.

11. The differential mechanism regulating device according to claim 1, wherein said first and second cables are connected to said collecting member via adjusters which adjust cable lengths of said first and second cables.

* * * * *